United States Patent [19]

Bartholomew

[11] Patent Number: 5,031,941

[45] Date of Patent: Jul. 16, 1991

[54] SANITARY CONNECTORS

[75] Inventor: Donald D. Bartholomew, Mt. Clemens, Mich.

[73] Assignee: Proprietary Technology, Inc., Southfield, Mich.

[21] Appl. No.: 405,759

[22] Filed: Sep. 11, 1989

[51] Int. Cl.⁵ .............................................. F16L 55/00
[52] U.S. Cl. ...................................... 285/91; 285/319; 285/921
[58] Field of Search ................... 285/319, 320, 64, 179, 285/921, 379, 91, 401, 360, 376, 400

[56] References Cited

U.S. PATENT DOCUMENTS 2,165,163  4/1939  Waters ..................................... 285/91

Primary Examiner—Randolph A. Reese
Assistant Examiner—Heather Chun
Attorney, Agent, or Firm—Harness, Dickey & Pierce

[57] ABSTRACT

A connector for a piping system has a female socket with a rotatable sleeve. The sleeve and female socket include a flange system to retain the sleeve in position to retain a male conduit within the female socket.

8 Claims, 3 Drawing Sheets

SANITARY CONNECTORS

BACKGROUND AND SUMMARY OF THE INVENTION

In the food, medical, and chemical industries it is necessary to communicate various devices by means of a heavy duty, high pressure, easily cleaned piping system.

In the current systems, pipes are connected by means of a face flange which carries a seal. The flanges attached to ends to be connected do not accommodate length or face angle variations. To allow the bolting, or band rings that are commonly used to forcibly mate the flanged pipe ends to perform their function, the flanges must almost perfectly mate. This perfect mating requirement results in a very costly burden being imposed on every piping system of this nature because even small errors can not be tolerated.

The connection system disclosed herein allows sufficient error in the location of devices and actual piping to permit piping systems to be specified and produced off-site at much lower cost, and to be quickly and reliably connected on site.

A further advantage is that no welding is required, so that area of susceptibility to problems is avoided entirely. Also, because an internal stop is used to prevent a male end from entering a female beyond the allowable tolerance, vertical pipe runs are also simple with the disclosed connectors.

The design is such that if it is desired to replace a seal or retainer of an installed connection, such replacement may be made without even disconnecting the opposite end of the pipe.

The nature of the connection is such that it is possible to mount the pipes in such a manner that it is possible to provide a controlled absorption of "hammer" energy in the piping system, thereby significantly reducing the sometimes disastrous results of these very energetic pressure surges on system control and measuring equipment.

It is accordingly an object of the connector disclosed to:

Provide a connector female which is easily integratable into a wide family of fittings so that a simple male end on a pipe may be merely plugged into the female.

Provide a family of fittings that permit all of the necessary solutions to conditions encountered in this type of piping.

Provide a connection which is tolerant of the normal errors encountered in this type of piping.

Provide a connection which allows a significant reduction in the cost of installing this type of piping.

Provide a connection, that when used in conjunction with a suitable energy absorbing mounting, will permit movement of the pipes or connectors to allow absorption of "hammer" energy in a manner controlled by the mounting means.

Provide a connection which is easily and totally disassembleable for cleaning or replacement of internal parts.

Provide a connection that can have a special lock installed which will act to discourage unauthorized disconnection.

The sanitary connection herein disclosed may be readily understood by referring to the following figures.

Figure 1:
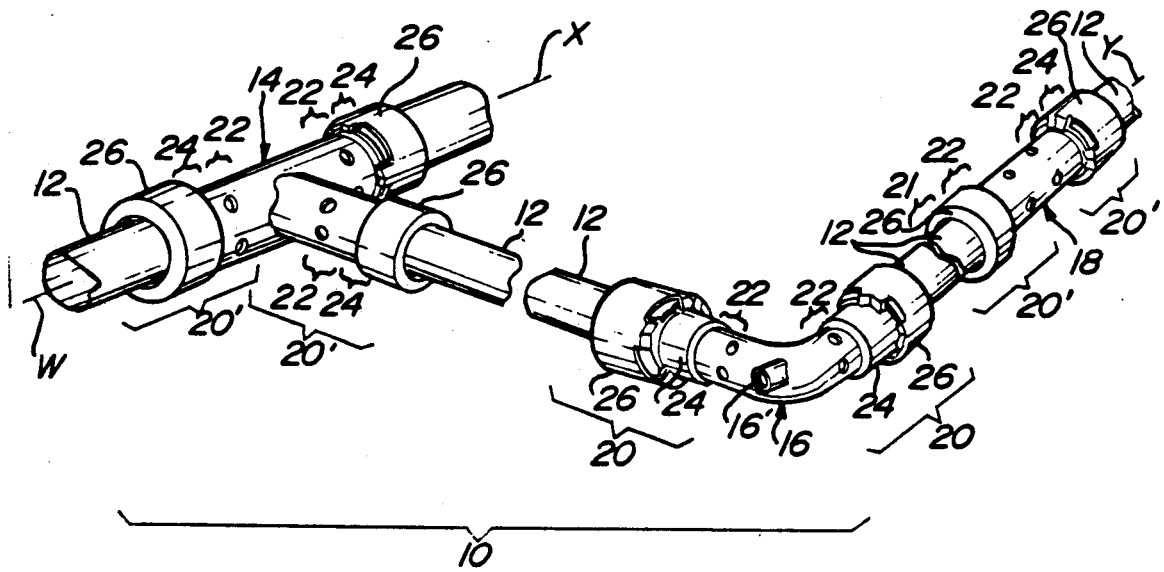
FIG. 1 shows a portion of a typical system and a tee and union of one construction, and an elbow of an alternate construction. The elbow also incorporates means of mounting a sensor or connecting some other device.

Referring to FIG. 1, a portion of a piping system 10 is shown Pipe portions 12 are interconnected by means of a "tee" fitting 14, an "elbow" fitting 16 and a "union" fitting 18. Two types of construction of the female housing portions 22 and 24 of the connector are shown. The "tee" and "union" fitting contain an inner bushing element that allows the stepped diameter between portions 22 and 24 of the elbow fitting 16 to be avoided where dimensions would cause trouble in the manufacture of the fitting. It is noted that the connecting pipe portions 12 are not necessarily all the same diameter; the fitting port is merely made to accommodate whatever diameter is chosen for the male termination of pipe portion 12. Element 26 is a rotatable, removable outer thrust sleeve that secures the connection internal parts, receives forces from the internal parts and transfers them to the connection female housing portion 24. The entire connection is shown by the numeral 20. It is typical that such piping systems have sensing devices installed. 16' is shown as a port for such a device.

Figure 2:
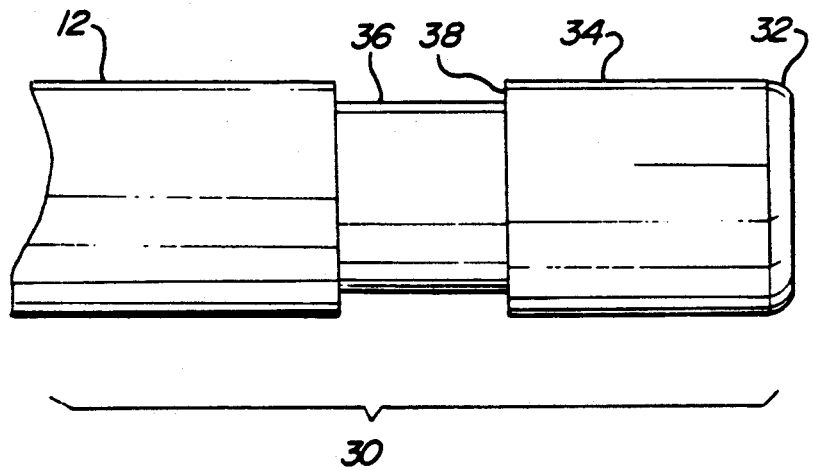
FIG. 2 shows a male end according to the connection disclosed herein.

FIG. 2 shows a male end 30 that is used as one half of connection 20. The pipe portion 12 has a reduced diameter portion 36, a shoulder 38 of which cooperates with the sprung stiff portions of the connector 20 retainer. Portion 34 is smoothed so as to provide a seal surface for the sealing means that is located inside female housing portion 24 of connection 20. Chambered or rounded end 32 of pipe 12 provides a lead-in, and prevents damage to the seal as the end 30 is installed into the connection 20.

Figure 3:
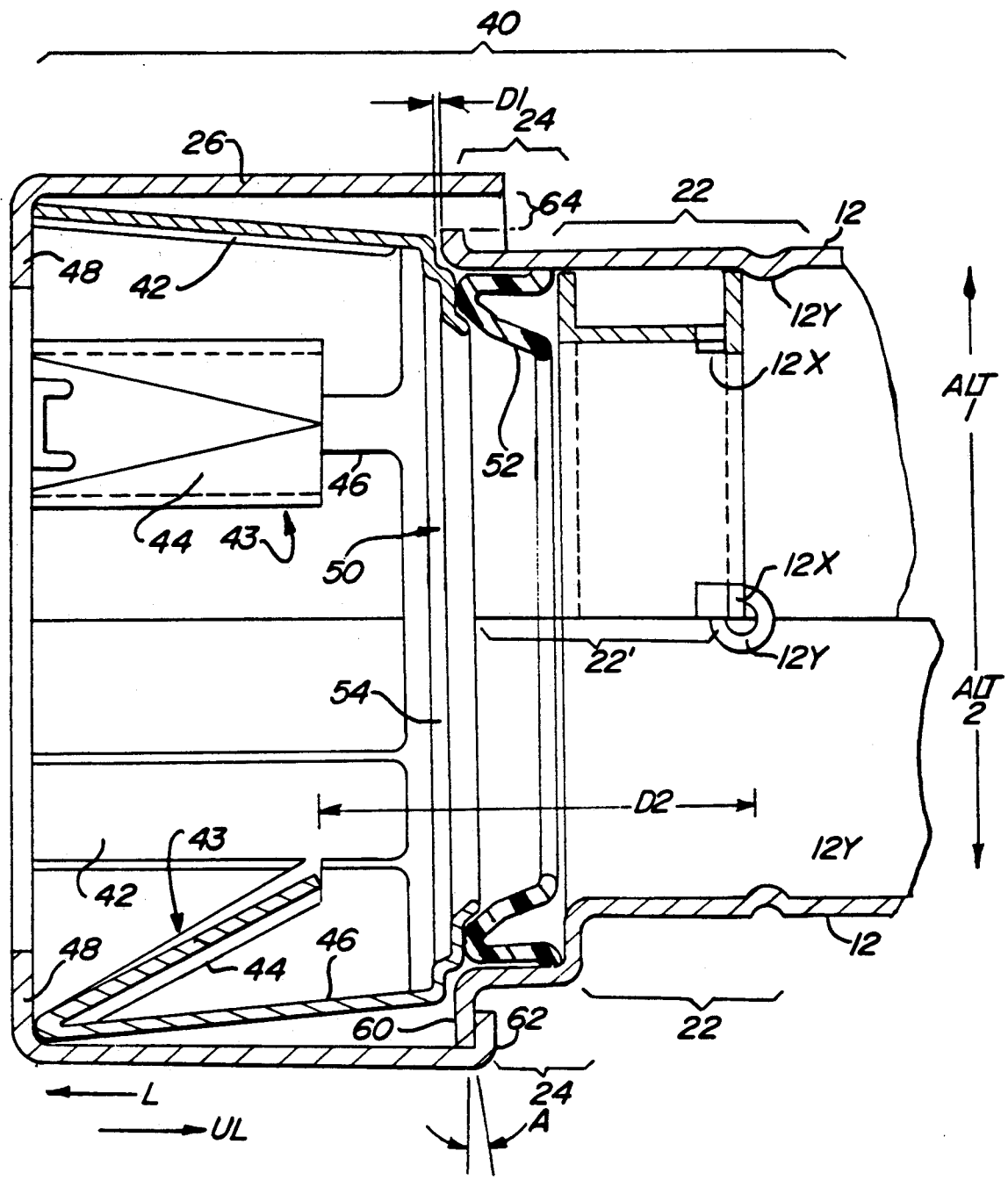
FIG. 3 shows a female end according to the connection disclosed herein, with two methods of construction of the tubular housing portion.

FIG. 3 shows the female half 40 of connection 20. Alternate means of providing portion 22 of female half 40 are shown as alternate 1 and alternate 2. Rotate to lock, or unlock and remove, outer thrust sleeve 26 locks to the flanged end of female housing 24. The flanged end of the female housing 24 is segmented with flange segments 60 which are separated by non-flange engaging means 64. The flanged end of the sleeve 26 may be positioned past the location of the flange portion 60, by aligning flange portions 62, so that the flange portions 62 will pass by non-flanged area gap 64. Flange portions 60 and 62 are made so as to cooperatively detent lock. The locked relationship results in a small movement of sleeve 26 relative to female housing portion 26 as shown by directional arrow "L". This occurs as the "nesting" of flange portions 60 and 62 detent occurs. Sleeve 26 is somewhat prevented from movement in the direction "UL" (unlock) by the action of retainer 50 being forced to compressively distort elastomer seal 52. Seal 52 is only very slightly distorted in the locked and detented position of flange areas 60 and 62. To remove sleeve 26 from female housing portion 24, it is necessary to rotate sleeve 26 relative to portion 24. As this rotation occurs, flange portions 62 move out of the detented position, resulting in a movement of sleeve 26 in direction "UL", which as explained previously, causes a distortion of seal so that resists the movement in the "UL" direction. When flange segments 62 are rotated so that they align with gaps 64 between flange segments 60, sleeve 26 may be removed from female housing portion 24. It is found to be useful to form flange portions 60 and 62 so that there is an engaging angle "A", as shown in FIG. 3. This angle aids in the formation of the detented area, and when sleeve 26 is experiencing force in direction "L", the angle causes tighter slightly inward forces to occur at the detent which better coaxially center sleeve 26 on female housing portion 24.

Retainer 50 serves a number of functions in addition to its part in the detenting sequence described above. As shown, retainer 50 has a stepped diameter form 54 which is stronger in resisting deformation so that it may better support seal 52 as confined pressure tends to blow seal 52 out of housing female portion 24. Forces on area 54 that are applied by seal 52 are resisted by stiffened arms 42 which project away from ring area 54, so that forces applied by seal 52 are transferred by arms 42 to abutting wall portion 48 of sleeve 26.

Between arms 42 are a series of arms 43 adapted to snap engage pipe 12 when pipe 12 is installed into female connection 40. These arms 43 are provided with springy portions 46 which support stiffened portions 44 which engage the abutting wall 38 which is formed when reduced diameter portion 36 of pipe 12 is formed (see FIG. 2). Forces in direction "L" on pipe 12 are transferred to stiff arm portions 44 by abutting wall 38, and stiff arm portions 44 transfer these forces to abutting wall 48 of sleeve 26. Arm portions 44 are "darted" as shown so that the main forces that must be transferred are received and transferred by the outer areas of arm portions 44. This leaves the bend in flexible arm portion 46 relatively unstressed by these transferred forces.

This type of retainer is further described in the inventors U.S. Pat. No. 4,601,492, Issued July 22, 1986 and owned by the common assignee of this application. As pipe 12 is installed into female connector half 40, arm portions 44 are forced open by lead 32 at the end of male portion 30 and are held open by sealing surface 34. When reduced diameter portion 36 arrives under arm portions 44, arm portions 44 move inward, locking male end 30 into the female 40. It is noted that arm portions 44 would also lock a pipe end 30 where an external or outwardly extending abutting wall was used in the place of the smaller pipe diameter 36 and its abutting wall 38. Arm portions 44 would only be forced to open more as the increased diameter passed. They would move inward as the larger diameter passed and engage the abutting wall formed at the rear of the larger diameter. This mode of operation is discussed at length in the patent previously cited.

Two methods of providing portion 22 of female half 40 have been previously referred to as alternates 1 and 2. The function of portion 22 is to act as a means of centering surface 34 of pipe 12 male end 30 in seal 52. As has been discussed, some materials like stainless steel fracture badly when one attempts to make large percentage distortions that are sometimes required.

It is therefore helpful to have an alternate means by which a function may be accomplished without resorting to such deformation. Alternate 1 shows a formed "U" cross section ring that may be inserted into a larger diameter pipe portion, thereby avoiding the necessity of stretching the material of the pipe wall to form the diameter 24 for the seal 52. This ring 22' does not have to be a complete ring (360 degrees), it may instead be formed so that a small washable gap is present. This avoids welding, or a possibly more difficult stamping and forming operation. Where the dimensions and materials allow, alternate 2 is the preferred method because it reduces by one part the number of parts required.

Projections 12X and 12Y act as stops to prevent inward movement of parts like 22' or end 30 into connector female 40.

A considerable length tolerance of pipe 12 is possible by having the distance (D2) between the engaging end of arms 44 and stops 12X or 12Y being greater than the distance from abutting surface 38 and pipe 12 end 32. The dimensions are chosen in a fashion that leaves surface 34 of end 30 always within seal 52 and centering portion 22 or 22'. When desired, pipes 12 may be mounted so that female connector halves 40 are between male withdrawal and male insertion depth the limits set by the abutting walls 38 and stops 12X or 12Y. When this approach is chosen, the ends 30 cannot be blown off or unintentionally released unless intentionally released, however, it is possible to loosen the pipe 12 mounting and slide the pipe into the connector female half 40 at the end opposite the end where one wishes to uncouple and replace internal parts. When complete, one merely returns the pipe 12 to its original position, secures pipe 12 in that position. It is then possible to recouple the end that was repaired.

Distance D1 in FIG. 3 between retainer 50 and the flanged end of female portion 24 is provided so that compression of seal 52 may occur, and is limited during the detenting that is required when sleeve 26 is rotated to couple or decouple.

It is also noted that the innermost wall of insertable bushing 22' may be shaped so as to minimize the effects on flow character of a sudden change from the inside diameter of male end 30 to the larger inside diameter of a fitting such as 14, 16, or 18, or a larger pipe 12, or oppositely from a larger to smaller inside diameter.

Figure 4:
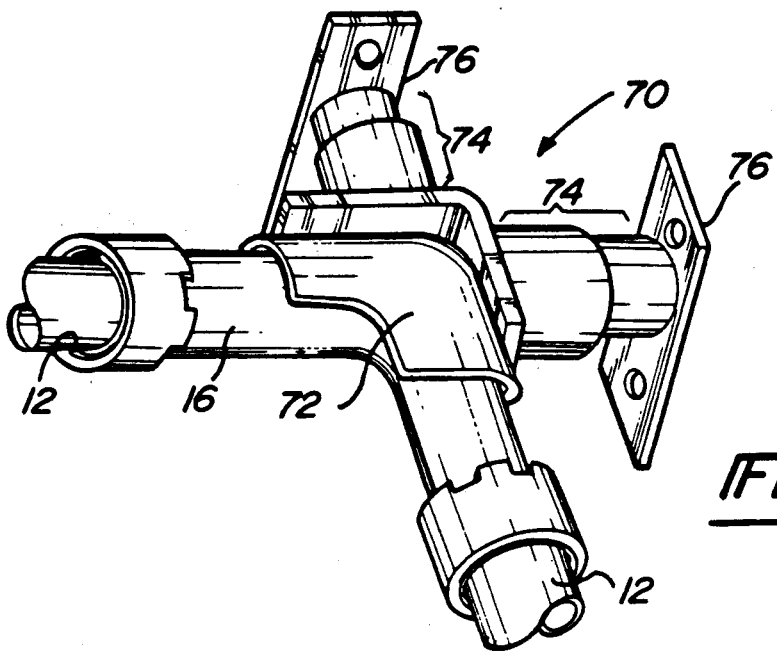
FIG. 4 shows a mounting means for a pipe connected by the means disclosed herein. The mounting means is adapted to absorb "hammer" energy by using the movement of the pipe that is allowed by the connector.

Referring to FIG. 4, an elbow 16 is shown mounted in a shock absorbing holder 70. The elbow 16 is cradled in a holding pocket 72. Affixed to pocket 72 are two shock absorbing units 74 which are attached in a manner that allows movement along the axis of the arm of pipe 12 or elbow 16 that is thrust parallel to its shock absorbing axis. Alternately, one shock absorbing unit 74 could be used along the axis bisecting the axis of the arms of the elbow 16. When "hammer" energy is to be absorbed by unit 70, the elbow 16 is driven momentarily in a direction away from the ends (not shown) of pipes 12. This action is resisted by shock absorbing unit 70 which dissipates the "hammer" energy, passing such energy through mounting means 76 to whatever structure (not shown) that unit 70 is mounted to.

Figure 5:
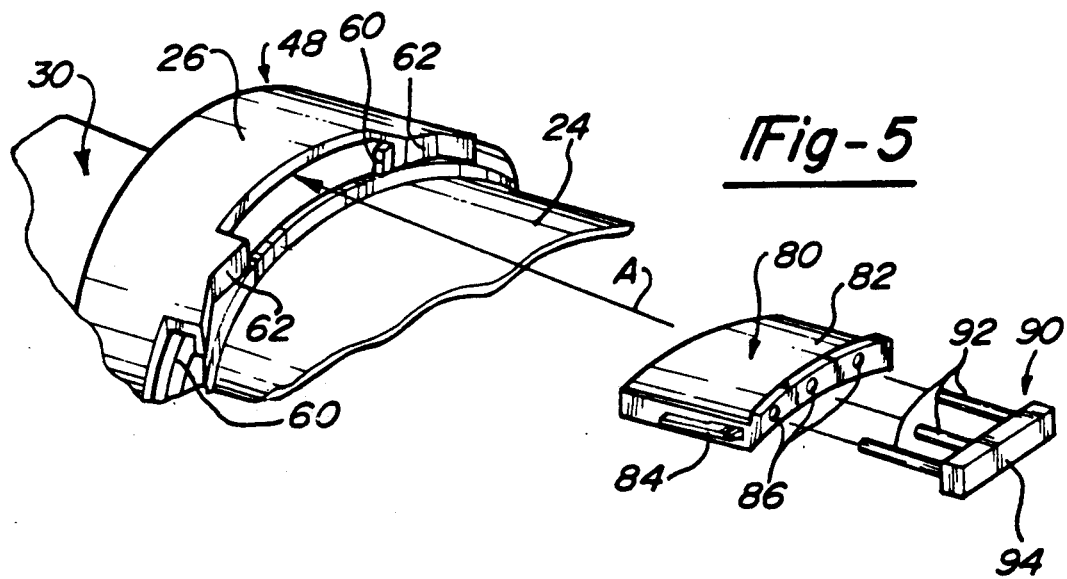
FIG. 5 shows a locking device and key that can be used to prevent rotation of the outer sleeve of the connector relative to the female housing of the connector.

Referring to FIG. 5, a portion of female end 40 is shown with a portion of thrust sleeve 26 with inwardly depending locking flange segments 62 detentively engaged to the segmented outwardly directed flange portions 60 of female housing portion 24. Lock 80 is inserted into the gap between these flange segments as indicated by arrow "A". This insertion is allowed when key 90 is inserted into lock 80. The travel of pins 92 into guide holes 86 cause a displacement of an interior mechanism which causes locking arms 84 (one not shown) to be withdrawn into the interior of lock 80. Portion 94 of key 90 is mounted to a handle (not shown) which facilitates installation and removal of lock 80 from the open gap area between flange segments 60 and 62.

With lock 80 installed, rotation of sleeve 26 is obstructed, preventing uncoupling of the female portion 40 from male end portion 30.

By the means described above it is possible to limit the ability to decouple a joint of a piping system to only those with a key 90, and there by gain an additional protection from mistaken release or sabotage. When key 90 is removed from lock 80, locking arms 84 are once again outwardly deployed, preventing removal of lock 80 from the now locked connection.

The connector disclosed herein seeks to bring to the industries that utilize the types of piping described herein, features that are only available by use of much more expensive and often inferior means. The features of effective shock mounting to absorb the "hammer" energy, and the ability to lock an assembled connection, are results of the design concept of the connector. This concept not only yields a totally cleanable connector, but a connector of inherent productability, low cost, shock mounting and locking features as well.

Figure 6:
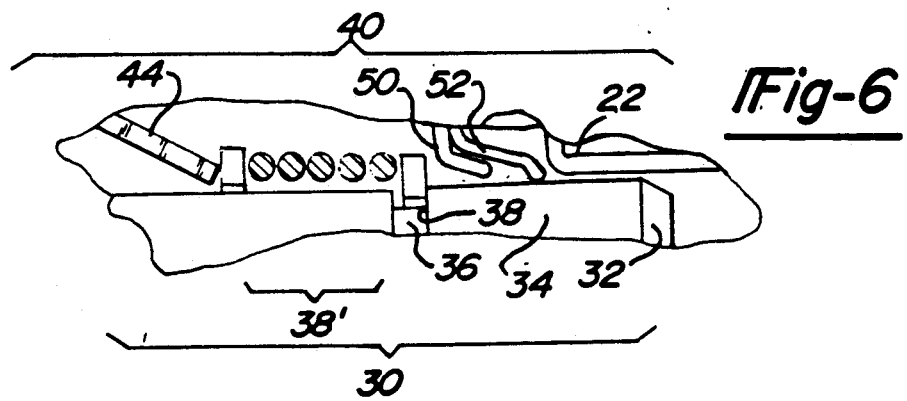
FIG. 6 shows a means of providing shock absorption within the connector.

FIG. 6 shows a means by which shock absorbing capability may be incorporated into each joint. When desired, it is possible to increase the distance between the locking end of stiff portions 44 of retainer 50 and abutting wall 38 of male end 30. Into this additional space one interposes a spring unit 38'. This spring unit 38' absorbs the "hammer" shock which tends to drive the connection female 40 off of the male half 30. The spring unit 38' is suddenly compressed by the "hammer" shock pressure. Compressing spring element 38', as a result of the movement of the female portion 40 relative to the male portion 30 has the affect of adding more volume to the piping system. This very rapidly dissipates the pressure "spike" of the "hammer", and very near its source. The energy (less mechanical losses) is returned to the system at a much slower rate which results in a much lower and broader pressure "spike" as the captured liquid mass of the system is accelerated by the springs at the various joints which have absorbed the sudden high pressure "spike" of the "hammer".

In systems which require cleaning, very often it will be desirable to use the shock absorbing means shown in FIG. 4, which is external to the piping system entirely. For systems which are rarely cleaned, the spring means 38', though located outside of the confined liquid volume is still in very close proximity to the confined volume, and thus the possibility of contamination is greater.

The features of the connectors disclosed herein are solutions to problems faced in all piping systems which have non-steady state operating conditions. For that reason, it is possible that the connectors disclosed herein will be economically useful in situations that do not require frequent disassembly for washing.

What is claimed is:

1. A coupler for the ends of the pipes which confines a medium under pressure which consists of:
   a male portion which may be plugged into a female portion and be locked into said female portion by the action of a retaining element, and be sealed into said female portion by a seal which seals the outer surface of said male to the inner surface of said female;
   said female portion being further defined by an outer thrust force transmitting sleeve which transmits thrust forces to a female element which contains said seal and means to center said male in said seal;
   said sleeve being rotatable relative to said female element, and removable from said female element by alignment of segmented inwardly depending flanges with spaces between outwardly extending flange segments provided on said female element;
   said sleeve being prevented from being rotated to said alignment by a cooperative detenting type of engagement between said inwardly depending and outwardly extending flanges, said thrust forces being transmitted from said sleeve to said female element by means of the engagement of said flanges;
   said retainer combining the functions of securing said seal in position by transmitting forces which would dislodge said seal to an abutting wall formed on said sleeve at the end opposite to said flanges by means of a plurality of arms extending from a ring-like structure that abuts said seal, said retainer also supporting compressive force resisting fingers by means that are spring portions also extending from said ring that allow said fingers to spring open and back into locking engagement with said male portion, said locking engagement consisting of interposing said fingers in between an abutting surface provided on said male portion and said sleeve abutting surface;
   said male and female portions being constructed such that all parts or components of said male and female portions are easily disconnected and disassembled for purposes of cleaning each part or component.

2. As in claim 1, wherein said means of centering said male in said seal is a separate part installed into said female element inward of said seal, and limited in its inward position by stops provided in said female element.

3. As in claims 1 or 2, wherein said male is prevented from entering too far into said female element by stops provided in the interior of said female portion.

4. As in claim 1, where extra space is provided between a male withdrawal limit and male insertion depth limit for purposes of allowing the male/female sealing to be operative between these limits, there by increasing the length tolerance on male piping segments between system devices containing female portions of the connection.

5. As in claim 4, wherein an external means is used to hold system devices, where said holding means allows said devices to move in response to a sudden surge of pressure confined by said system for the purpose of reducing the maximum transient pressure experienced by said system.

6. As in claim 4, wherein a spring-like compressive member is interposed between the means on said male and in said female portion for the purpose of allowing said female portion to move relative to said male portion during a transient increase in system pressure.

7. In a connector for sealably connecting male and female connecting elements together, wherein said male or female includes a rotatable sleeve portion with inwardly depending flange segments which detentingly engage outwardly directed flange segments on a fixed portion of said other male or female element, and said sleeve portion including means for retaining a conduit with an abutment surface coupled with said male or female element, said retaining means including a plurality of arms for abutting said conduit abutment surface for locking said conduit within said sleeve, and a device which is interposed between said flange segments to prevent rotation of said sleeve to decouple said sleeve from said fixed male or female element.

8. As in claim 7, wherein said device is comprised of a key or tool removable positioned in between at least one of said flange segments.

* * * * *

UNITED STATES PATENT AND TRADEMARK OFFICE
CERTIFICATE OF CORRECTION

PATENT NO. : 5,031,941

DATED : July 16, 1991

INVENTOR(S) : Donald D. Bartholomew

It is certified that error appears in the above-identified patent and that said Letters Patent is hereby corrected as shown below:

Column 1, line 19, "can not" should be --cannot--.

Column 2, line 18, after "shown", insert --.--.

Column 2, line 44, "Chambered" should be --Chamfered--.

Column 2, line 61, "26" (second occurrence) should be --24--.

Column 3, line 6, after "that", insert --it--.

Column 4, line 24, after "between", insert --the--.

Column 4, line 24, after "depth", delete "the".

Column 5, line 12, "there by" should be --thereby--.

Column 6, line 49, claim 4, "there by" should be --thereby--.

Column 8, line 4, claim 8, "removable" should be --removably--.

Signed and Sealed this

First Day of June, 1993

Attest:

MICHAEL K. KIRK

*Attesting Officer*     *Acting Commissioner of Patents and Trademarks*